Oct. 27, 1925.
D. C. TEETOR
PISTON MECHANISM
Filed Aug. 23, 1924
1,558,515
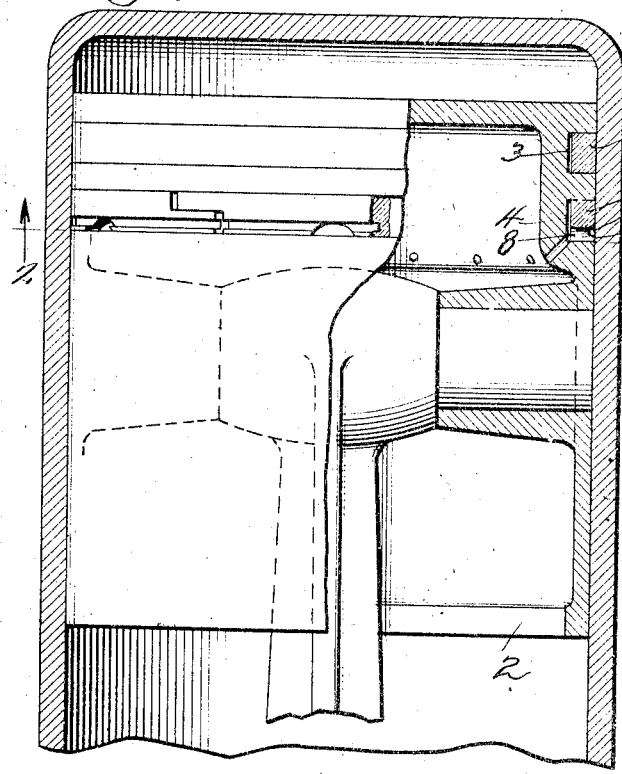
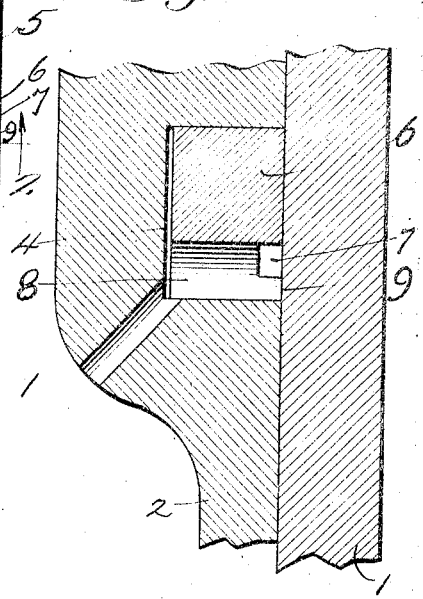
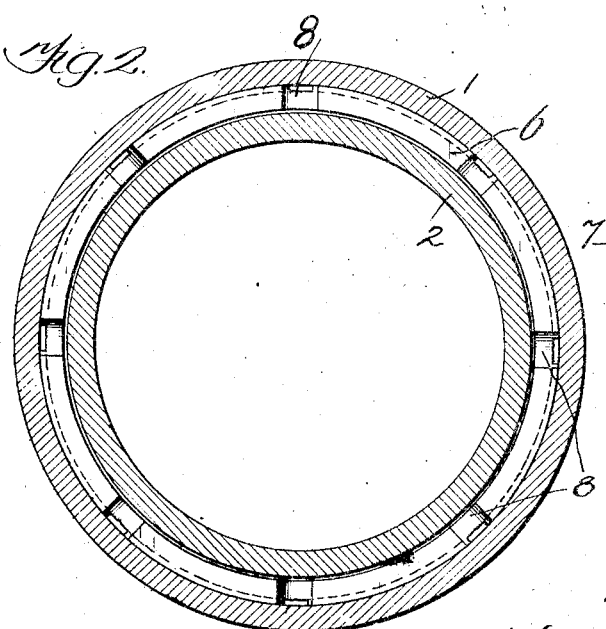
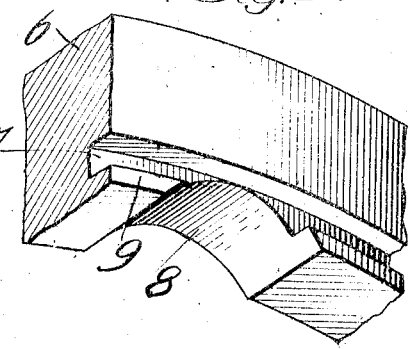
Inventor:
Daniel C. Teetor
By G. L. Gragg
Atty.

Patented Oct. 27, 1925.

1,558,515

UNITED STATES PATENT OFFICE.

DANIEL C. TEETOR, OF INDIANAPOLIS, INDIANA.

PISTON MECHANISM.

Application filed August 23, 1924. Serial No. 733,702.

*To all whom it may concern:*

Be it known that I, DANIEL C. TEETOR, a citizen of the United States, residing at Indianapolis, in the county of Marion and the State of Indiana, have invented a certain new and useful Improvement in Piston Mechanism, of which the following is a full, clear, concise, and exact description.

My invention relates to mechanism employing pistons and piston rings. The invention comprises a hollow piston formed with a piston ring receiving groove having passages establishing communication between the piston interior and said groove, and a piston ring occupying said groove and having an external circumferentially extending groove in its outer circular face and in a zone between the flat faces of the ring, said ring also having passages formed in and extending across one flat face of the ring and of a depth to merge with the aforesaid groove in the ring.

The lubricating oil is spread in the downward or inward movement of the piston, the passages formed across one flat face of the ring directing a portion of the oil directly to the ring receiving groove in the piston whence it passes to the piston interior, the oil passing through the circumferential groove in the ring being lessened. This groove is preferably in a zone spaced apart from both flat faces of the ring to avoid a sharp scraping edge at a corner of the ring, the preferred form of ring of my invention not effecting too severe removal of oil. The groove in the ring being in the outer circular face of the ring is covered by the cylinder rather than by a wall of the ring receiving groove in the piston, and the piston needs no chamfering to gain access to the groove in the ring.

The invention will be more fully explained in connection with the accompanying drawing, showing the preferred embodiment, in which Fig. 1 is a view of an engine portion showing parts in section, and parts in elevation; Fig. 2 is a sectional view on line 2—2 of Fig. 1; Fig. 3 is a sectional view of parts, on a larger scale; and Fig. 4 is a perspective view of a fragmentary portion of the ring.

The engine cylinder 1 may be of any suitable type, the engine cylinder communicating at its inner end with the crank case containing a bath of lubricating oil from which working parts of the engine are supplied.

The piston 2 has one or more annular grooves 3, 4, that receive piston rings 5, 6. The piston ring groove nearest the crank case preferably contains the piston ring of my invention, it being unnecessary to provide such a piston ring in the other piston ring receiving grooves. The innermost piston ring 6 is formed with an external annular groove 7 in the outer circular face and in a zone of the piston ring that is parallel to and spaced apart from the inner and outer flat faces of the ring. Passages 8 are formed across the lower or inner flat face of the ring and of a depth to merge with the annular or circumferentially extending groove 7 in the outer circular face of the ring. The passages 8 are desirably comparatively shallow, on which account the groove 7 is much nearer the lower flat face of the ring than the other flat face. The groove 7 and passages 8 drain oil to the interior of the ring. The oil is spread in the downward movement of the piston by the lower outer corner of the ring so that the groove 7 is only required to take care of a comparatively small quantity of oil. The drains 8 being on the lower face of the ring, will carry away a certain amount of oil which will reduce the amount which the grooves 7 has to carry and will also naturally drain the oil that has been collected in the groove. A broad face 9 of the ring preferably remains in the zone of the passages 8, instead of a sharp scraping edge to prevent too severe removal of the lubricating oil. Moreover the groove is covered by the cylinder instead of by a wall of the ring receiving groove in the piston to facilitate the circulation of the oil, it being unnecessary to chamfer the piston to afford access to the groove in the ring. The construction of my invention is thus an improvement in important particulars over prior devices.

Changes may be made without departing from my invention.

Having thus described my invention, I claim:—

1. The combination with a hollow piston formed with a piston ring receiving groove and having passages establishing communication between the piston interior and said groove; and a piston ring occupying said groove and having an external circumferentially extending groove in its outer circular face and in a zone between and spaced apart from the flat faces of the ring, said ring also having passages formed in and extending across one flat face of the ring and of a depth to merge with the aforesaid groove in the ring.

2. The combination with a hollow piston formed with a piston ring receiving groove and having passages establishing communication between the piston interior and said groove; and a piston ring occupying said groove and having an external circumferentially extending groove in its outer circular face and in a zone between the flat faces of the ring, said ring also having passages formed in and extending across one flat face of the ring and of a depth to merge with the aforesaid groove in the ring.

In witness whereof, I hereunto subscribe my name.

DANIEL C. TEETOR.